UNITED STATES PATENT OFFICE.

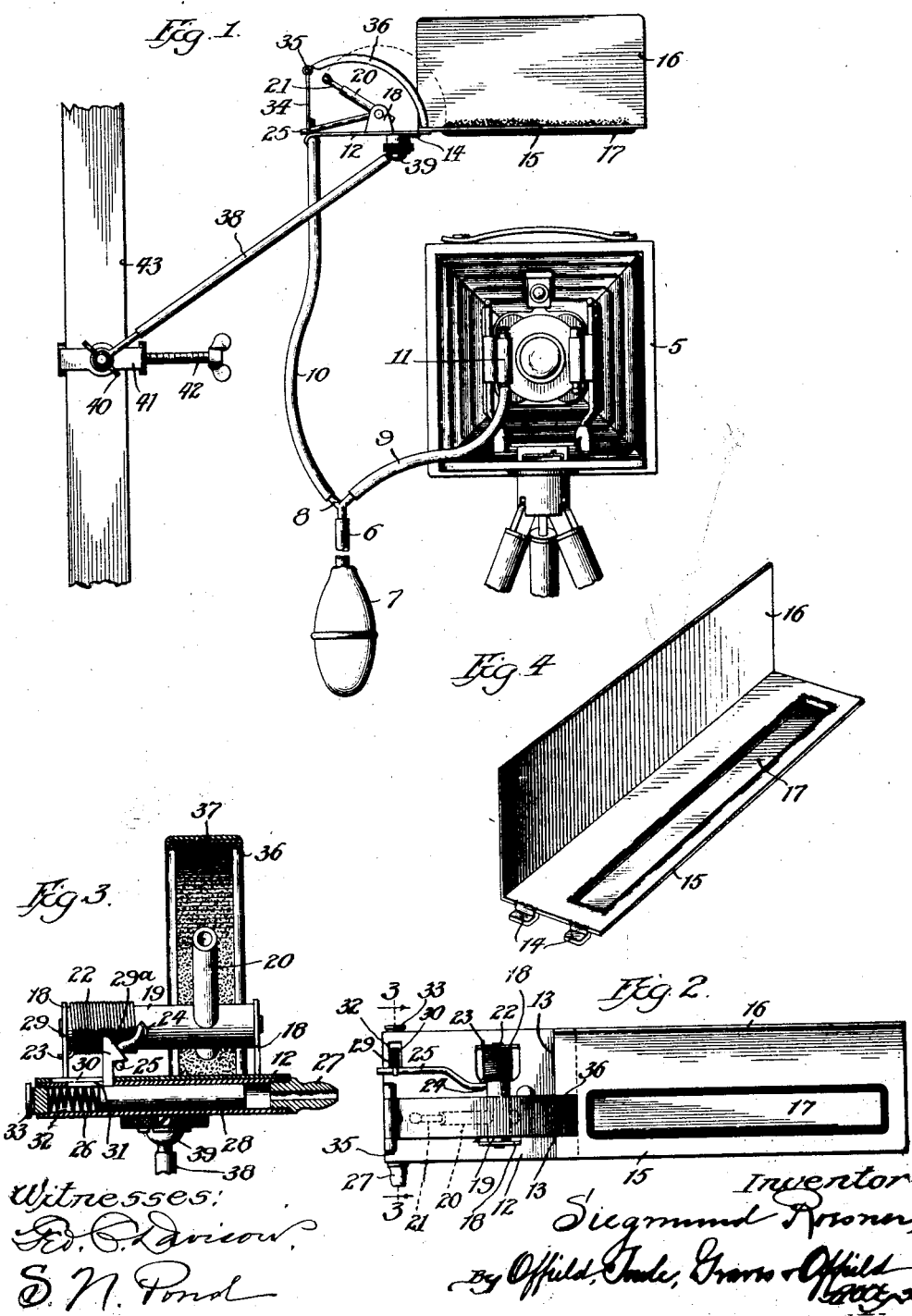

SIEGMUND ROESNER, OF CHICAGO, ILLINOIS.

FLASH-LIGHT ATTACHMENT FOR CAMERAS.

961,021. Specification of Letters Patent. Patented June 7, 1910.

Application filed May 28, 1909. Serial No. 498,821.

*To all whom it may concern:*

Be it known that I, SIEGMUND ROESNER, a subject of the Emperor of Russia, who have announced my intentions of becoming a citizen of the United States, residing at Chicago, in the county of Cook and State of Illinois, have invented certain new and useful Improvements in Flash-Light Attachments for Cameras, of which the following is a specification.

This invention relates to improvements in flash-light devices for use in photography, the chief object of the invention being to provide an improved device whereby a charge of flash-light powder can be ignited through the agency of an ordinary match, and in properly timed relation to the exposure of the lens of the camera; a further object of the invention being to provide improved means whereby the ignition of the powder and the opening of the shutter of the camera can be effected through a single actuation of the ordinary hand bulb employed in pneumatically operated camera shutters.
In an application heretofore filed by me on the 27th day of February, 1909, Serial No. 480,471, I have disclosed and claimed a flash-light apparatus operable independently of the camera shutter. The flash-light apparatus herein disclosed is similar in its main features to the apparatus shown and claimed in the aforesaid application, but embodies some improvements thereon which, in part, are especially adapted and designed to facilitate the setting of the apparatus and to render the device operable by the same pneumatic impulse which opens the camera shutter.

The invention will be readily understood when considered in connection with the accompanying drawings illustrating one practical embodiment of the invention, and in which—

Figure 1 is a front elevational view of the device shown as applied to an ordinary camera of the pneumatically operated shutter type. Fig. 2 is a top plan view of the ignition device on a somewhat enlarged scale. Fig. 3 is a vertical transverse section on a further enlarged scale through the ignition device; and Fig. 4 is a perspective detail of a detachable and interchangeable powder-pan.

Referring to the drawings, 5 designates as an entirety an ordinary camera having a pneumatically operated shutter, and 6 a rubber tube having the usual hand bulb 7. The tube 6 is connected by an ordinary Y-coupling 8 with a pair of branch tubes 9 and 10, the former of which connects with the pneumatic cylinder 11 of the shutter-actuating mechanism.

Referring to the ignition device, 12 designates a base-plate, one end of which is formed with a pair of narrow rectangular slots 13 adapted to receive a coöperating pair of angularly bent tenons 14 formed on one end of a detachable powder-pan 15. This latter has an upstanding rear wall or shield 16 and, preferably, a counter-sunk portion 17 adapted to contain a flash powder. This pan may be made of any suitable length according to the particular use of the camera, and, being readily detachable, may be easily replaced by longer or shorter pans according to the amount of powder required for the proper lighting of each photographic subject. In and between a pair of upstanding lugs 18 on the base-plate 12 is journaled a shaft or drum 19 that is equipped with a hollow radially disposed tube 20 constituting a socket or holder for the stem of an ordinary match 21; the drum 19 and tube 20 thus constituting a match-holder or carrier. The said match-holder is normally impelled to turn in a direction to swing the head of the match over toward the powder pan by means of a torsion spring 22 that is coiled around the drum 19, one end thereof being anchored at 23 in the bearing lug 18, while the other end, shown at 24, hooks beneath the inner end of a radial detent arm 25 secured to said drum.

Soldered or otherwise suitably secured beneath and across the end of the base-plate 12 opposite that to which the powder pan is connected is a cylinder 26, shown in sectional detail in Fig. 3, equipped at one end with a nipple 27 adapted for the ready attachment thereto of the branched tube 10. Slidably mounted in the cylinder 26 is a plunger 28, the rear end of which carries a hook or catch 29 that projects upwardly through registering slots 30 and 31 in base-plate 12 and cylinder 26, respectively. The plunger 28 is backed by a spring 32 adapted to be compressed between the rear end of said plunger and a screw-threaded plug 33 closing the rear end of the cylinder 26, whereby the plunger 28 is normally thrust forwardly with the hook or catch 29 at the limit of movement allowed by the slots 30 and 31.

The hook 29 is adapted to engage and hold the free end of the detent arm 25 of the match holder against the torsional effect of the spring 22; and to facilitate the engagement of said hook and arm, the upper end of the former is provided with an inclined edge 29ª over which the detent arm rides as it is depressed into engagement with the hook, the hook yielding and then snapping back over the depressed end of the arm, as clearly shown in Fig. 3. Secured to the same end of the base-plate 12, above the cylinder 26, is an upright supporting bracket 34, to the upper end of which is hinged at 35 one end of a curved scratcher bar 36, the opposite or free end of which latter normally overhangs the inner end of the powder-pan. This scratcher-bar is provided on its under side with a roughened surface, herein shown as a strip of sand-paper 37 suitably secured thereto; and said scratcher-bar is so located as to lie approximately coincident with the path of travel of the head of the match, so that, when the detent arm 25 is released, as hereinafter described, the head of the match rubs over the roughened under surface of the scratcher bar, slightly raising the latter on its pivot, the weight of the bar insuring a sufficient frictional contact to ignite the match. The match, when thus ignited, is thrown with its ignited head adjacent to the charge of powder, so that the latter is readily set off.

For convenience of supporting the ignition device in any suitable position relatively to the camera, I have indicated a supporting rod 38, one end of which is connected by a ball and socket joint 39 to the under side of the base-plate 12, while its opposite end is secured by a wing nut 40 to a clamp 41 which may be secured by its binding screw 42 to any suitable or convenient support, such as is indicated at 43.

The resistance of the spring 32 which opposes the rearward movement of the plunger 28 is such as to be slightly in excess of the resistance afforded by the shutter-opening mechanism; and the required degree of resistance in the spring 32 may be nicely adjusted by the screw-threaded plug 33. The result of this is that, when a pneumatic impulse is transmitted through the tube 6 and branch tubes 9 and 10 by a compression of the hand bulb 7, the shutter opens slightly in advance of the retraction of the plunger 28 which releases the detent arm 25 and permits the ignition of the powder, thus insuring the exposure of the sensitized film or plate to the person or object in advance of the lighting of such person or object by the burning of the powder. To reset the ignition device, it is necessary only to throw back the detent arm 25, this latter automatically reëngaging itself with the hook 29, swing back the scratcher-bar, insert a match in the holder 20, and deposit a sufficient charge of powder on the powder-pan. The compression of the bulb 7 is, of course, practically instantaneous; but irrespective of the speed with which the pneumatic impulse is transmitted, the greater resistance afforded by the spring 32 insures that the camera shutter shall be opened when the ignition of the powder takes place.

I claim:

1. The combination with a camera having pneumatically operated shutter-opening mechanism, of a flash-light ignition device having a scratcher-bar, a pivoted spring-actuated match-holder, a detent arm carried by said match-holder, an air cylinder, a plunger in said cylinder having an automatic catch to engage said detent arm, and a spring normally urging said plunger in a direction to engage said catch with said detent arm, a hand bulb, and a branched tube for transmitting a pneumatic impulse from said bulb to both said shutter-opening mechanism and said air cylinder, substantially as described.

2. The combination with a camera having pneumatically operated shutter-opening mechanism, of a flash-light ignition device having a scratcher-bar, a pivoted spring-actuated match-holder, a detent arm carried by said match-holder, an air cylinder, a plunger in said cylinder having an automatic catch to engage said detent arm, a spring normally urging said plunger in a direction to engage said catch with said detent arm, a hand bulb, a branched tube for transmitting a pneumatic impulse from said bulb to both said shutter-opening mechanism and said air cylinder, and means for adjusting the tension of said spring, substantially as described.

3. The combination with a camera having pneumatically operated shutter-opening mechanism, of a flash-light ignition device comprising a base-plate, a pivoted spring-actuated match-holder, a pivoted scratcher-bar, and a powder-pan all mounted on the said base-plate, an air cylinder carried by said base-plate, a plunger therein, a detent mechanism for said match-holder comprising a detent arm on said match-holder, a hook-shaped catch for said arm carried by said plunger and having a beveled upper edge, and a spring normally urging said plunger in a direction to engage said catch with said detent arm, a hand bulb, a branched tube for transmitting a pneumatic impulse from said bulb to said shutter-opening mechanism and said cylinder, and an adjustable abutment member for said spring, substantially as described.

SIEGMUND ROESNER.

Witnesses:
SAMUEL N. POND,
MATTIE B. BLISS.